(12) United States Patent
Wan et al.

(10) Patent No.: US 11,202,488 B1
(45) Date of Patent: Dec. 21, 2021

(54) SUN SHADE

(71) Applicant: Saudi Arabian Oil Company, Dhahran (SA)

(72) Inventors: Zhenzhu Wan, Dhahran (SA); Yin Xu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/989,556

(22) Filed: Aug. 10, 2020

(51) Int. Cl.
*A45B 23/00* (2006.01)
*E04H 15/20* (2006.01)
*E04H 6/42* (2006.01)
*G02B 5/23* (2006.01)

(52) U.S. Cl.
CPC ............... *A45B 23/00* (2013.01); *E04H 6/42* (2013.01); *E04H 15/20* (2013.01); *G02B 5/23* (2013.01); *A45B 2023/0093* (2013.01)

(58) Field of Classification Search
CPC .... A45B 15/20; E04H 15/20; E04H 2015/206
See application file for complete search history.

(56) References Cited

U.S. PATENT DOCUMENTS

| | | | | |
|---|---|---|---|---|
| 2,812,769 A | * | 11/1957 | Schaefer | E04H 15/20 52/2.15 |
| 2,850,026 A | * | 9/1958 | Leatherman | E04H 15/20 52/2.19 |
| 3,106,772 A | * | 10/1963 | Holcombe | E04B 1/3205 29/429 |
| 5,076,029 A | | 12/1991 | Sevilla | |
| 5,305,561 A | * | 4/1994 | Goddard | B63B 59/00 114/121 |
| 5,843,548 A | * | 12/1998 | Sanders | B60J 7/08 428/40.1 |
| 5,884,229 A | | 3/1999 | Matteucci | |
| 6,226,596 B1 | | 5/2001 | Gao | |
| 6,438,493 B1 | | 8/2002 | West et al. | |
| 6,571,815 B1 | * | 6/2003 | Hill | E04H 15/58 135/117 |
| 13,695,226 | | 4/2011 | Imhof et al. | |
| 8,219,322 B2 | | 7/2012 | Monsen | |
| 8,838,425 B2 | | 9/2014 | Zhang et al. | |
| 8,857,758 B2 | * | 10/2014 | Al-Garni | A45B 23/00 244/30 |

(Continued)

FOREIGN PATENT DOCUMENTS

| | | |
|---|---|---|
| CN | 101280131 | 10/2008 |
| CN | 201890079 | 7/2011 |

(Continued)

*Primary Examiner* — Noah Chandler Hawk
(74) *Attorney, Agent, or Firm* — Fish & Richardson P.C.

(57) ABSTRACT

The present disclosure describes a sun shade and a parking shade for a parking lot that includes a plurality of parking spots and one or more driving lanes. One sun shade includes: a panel that is configured to be inflated with a lifting gas to create a buoyant force and comprises hooks or eyelets for attaching tethers; one or more photochromic surfaces that reversibly darken on exposure to ultraviolet radiation and are arranged on a top surface of the panel, wherein portions of the panel that overlap with the one or more photochromic surfaces are transparent; and one or more photovoltaic units that are arranged on the top surface of the panel.

18 Claims, 5 Drawing Sheets

(56) References Cited

U.S. PATENT DOCUMENTS

| | | |
|---|---|---|
| 9,121,971 B2 | 9/2015 | Thorne |
| 9,216,822 B1 | 12/2015 | Rose |
| 10,193,494 B2 | 1/2019 | Nania et al. |
| 2003/0110018 A1 | 6/2003 | Dutta et al. |
| 2003/0200030 A1 | 10/2003 | Meldahl |
| 2007/0003776 A1 | 1/2007 | Kang et al. |
| 2008/0175478 A1 | 7/2008 | Wentland et al. |
| 2009/0283630 A1 | 11/2009 | Al-Garni et al. |
| 2010/0018566 A1 | 1/2010 | Jackson |
| 2011/0048731 A1 | 3/2011 | Imhof et al. |
| 2011/0251797 A1 | 10/2011 | Leger et al. |
| 2012/0261135 A1 | 10/2012 | Nowak et al. |
| 2013/0064040 A1 | 3/2013 | Imhof et al. |
| 2015/0073715 A1 | 3/2015 | Aarre |
| 2016/0313463 A1 | 10/2016 | Wahrmund et al. |
| 2017/0011149 A1 | 1/2017 | Liu et al. |
| 2019/0169873 A1* | 6/2019 | Tsao ........................ E04H 15/62 |
| 2021/0059366 A1* | 3/2021 | Sawalski ................. E04H 15/58 |

FOREIGN PATENT DOCUMENTS

| | | |
|---|---|---|
| CN | 103468074 | 12/2013 |
| CN | 203632591 | 6/2014 |
| CN | 106314749 | 1/2017 |
| CN | 206376414 | 8/2017 |
| DE | 10261746 | 7/2004 |
| JP | 1992068179 | 3/1992 |
| WO | WO 2016141484 | 9/2016 |

\* cited by examiner

SUN SHADE

TECHNICAL FIELD

This disclosure relates to shade for outdoor environments, such as parking lots.

BACKGROUND

In sunny and warm climates, shade makes it possible to safely and comfortably perform a variety of activities. Shade is sometimes provided by natural sources, e.g., by trees. Devices and structures may be used to provide shade when natural shade is insufficient or unavailable. For example, a canopy or roof and a load-bearing base that supports the canopy or roof in a substantially horizontal position can provide shade. Other examples of devices and structures that provide shade include umbrellas, pole tents, and carports.

SUMMARY

The present disclosure describes a sun shade and a parking shade for a parking lot that includes a plurality of parking spots and one or more driving lanes. One parking shade includes: a panel that is configured to be inflated with a lifting gas to create a buoyant force and comprises hooks or eyelets for attaching tethers, wherein a top surface and a bottom surface of the panel are dimensioned to cover the parking spots and one or more driving lanes; one or more photochromic surfaces that reversibly darken on exposure to ultraviolet radiation and are arranged on the top surface of the panel, wherein portions of the panel that overlap with the one or more photochromic surfaces are transparent, and wherein the one or more photochromic surfaces are arranged to be positioned over the one or more driving lanes; and one or more photovoltaic units that are arranged on the top surface of the panel, wherein the one or more photovoltaic units are arranged to be positioned over and cover the parking spots.

Another aspect features a sun shade including: a panel that is configured to be inflated with a lifting gas to create a buoyant force and comprises hooks or eyelets for attaching tethers; one or more photochromic surfaces that reversibly darken on exposure to ultraviolet radiation and are arranged on a top surface of the panel, wherein portions of the panel that overlap with the one or more photochromic surfaces are transparent; and one or more photovoltaic units that are arranged on the top surface of the panel.

The details of one or more implementations of the subject matter of this specification are set forth in the accompanying drawings and the subsequent description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
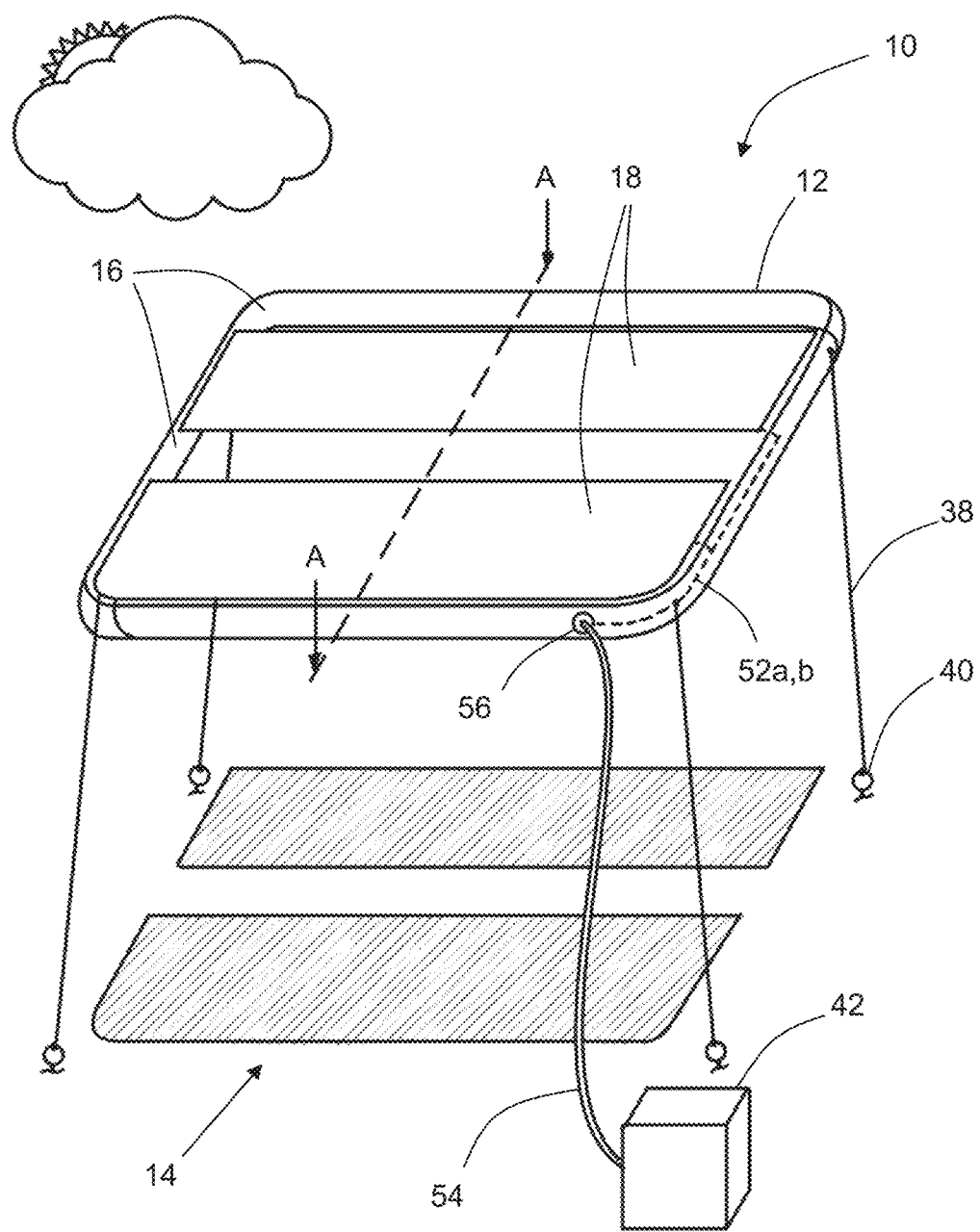
FIGS. 1 and 2 are a perspective views of a floating sun shade.

Referring to FIG. 1, a floating sun shade 10 includes a panel 12 that is inflated with a lifting gas and tethered in place. The shade 10 casts a variable shadow pattern 14 that changes in response to light exposure. More specifically, the panel 12 is at least partially transparent and includes one or more photochromic surfaces 16 that darkens on exposure to sunlight, i.e., ultraviolet radiation, and returns to a clear state when it is cloudy or at night. The top of the panel 12 also comprises photovoltaic units or surfaces 18 that generate electricity from sunlight and comprise an electrical connector that connects to a battery. The photovoltaic surfaces 18 are opaque or substantially opaque and cast a shadow on the ground below the panel 12.

Figure 2:
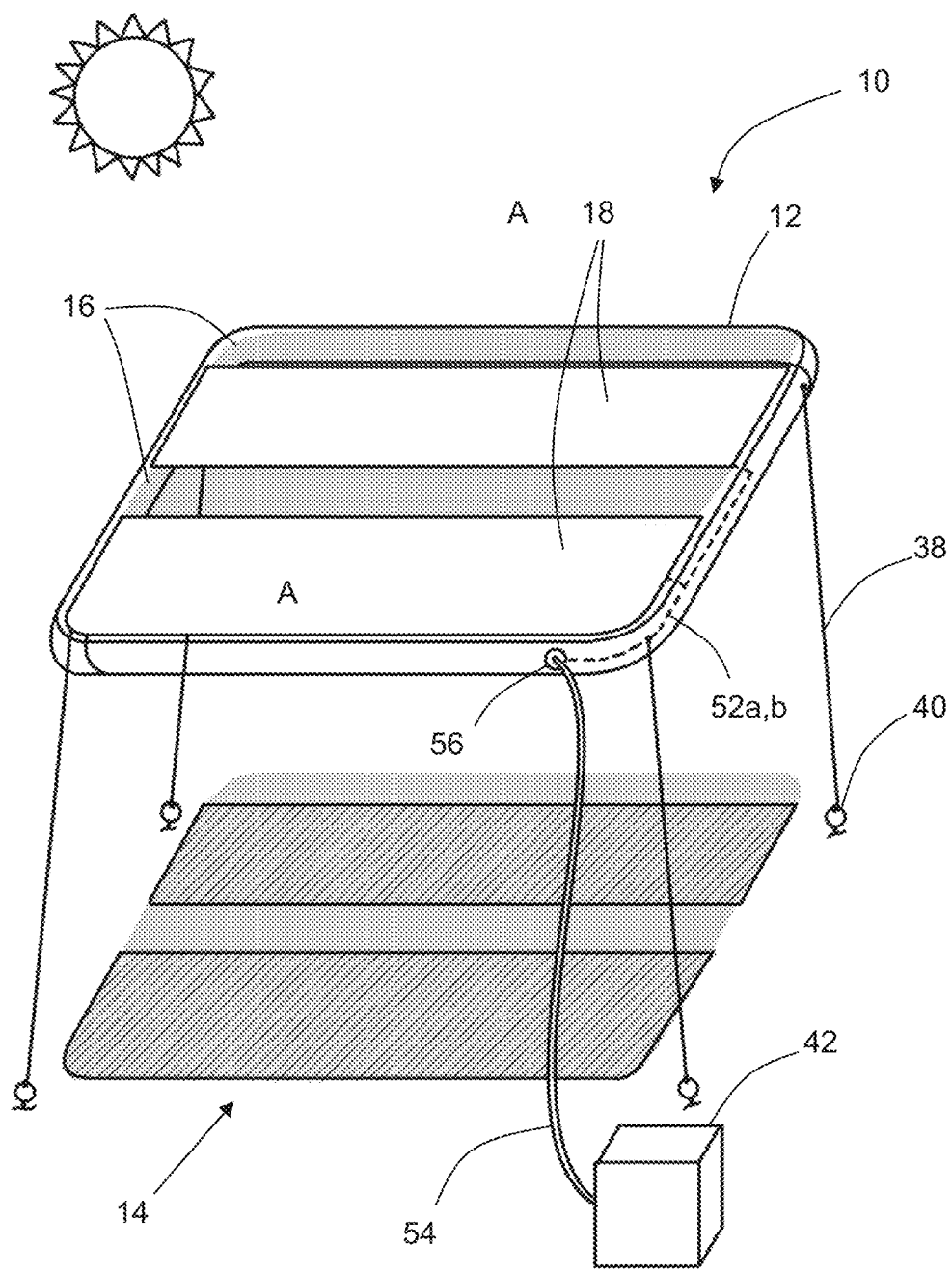

In FIG. 1, the sun is covered by clouds. In such low light conditions, the photochromic surfaces 16 are clear and the shadow pattern 14 is formed by two patches that correspond to the two photovoltaic surfaces 18. In contrast, FIG. 2 illustrates the shade 10 under sunny skies. In sunny conditions, the photochromic surfaces 16 become darker, e.g., similarly to the lenses of sunglasses. In FIG. 2, the shadow pattern 14 is formed by two darker patches that correspond to the photovoltaic surfaces 18 and two lighter patches that correspond to the photochromic surfaces 16. The shadow pattern 14 illustrated in FIGS. 1 and 2 may be modified by changing the size, shape and numbers of photochromic surfaces 16 and photovoltaic surfaces 18.

Figure 3A:
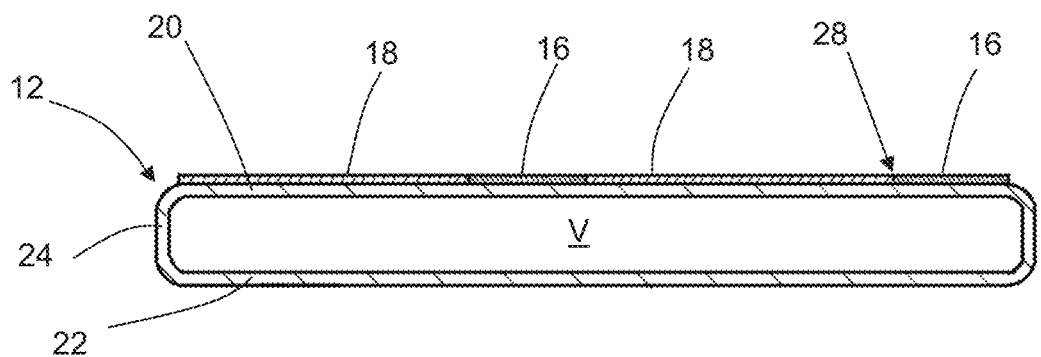
FIG. 3A-3D are cross-sectional views of the sun shade according to several implementations.
Figure 3B:
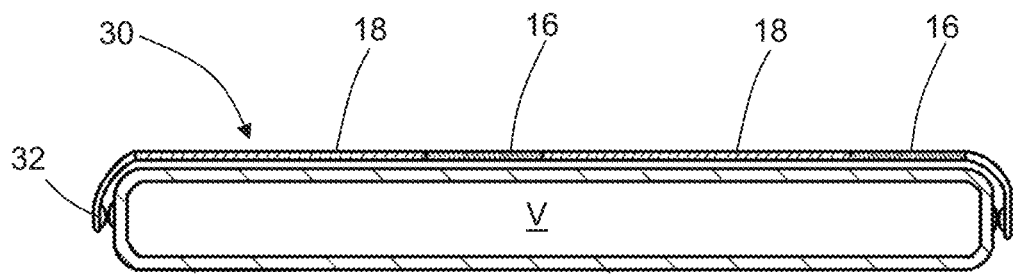
Figure 3C:
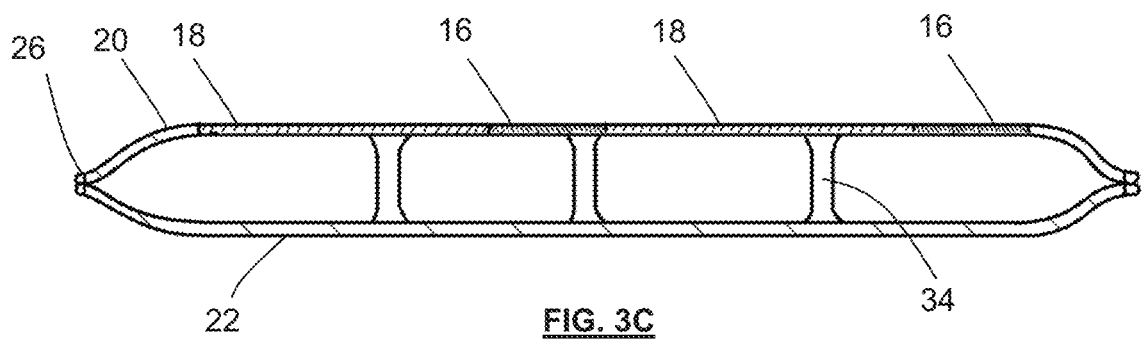
Figure 3D:
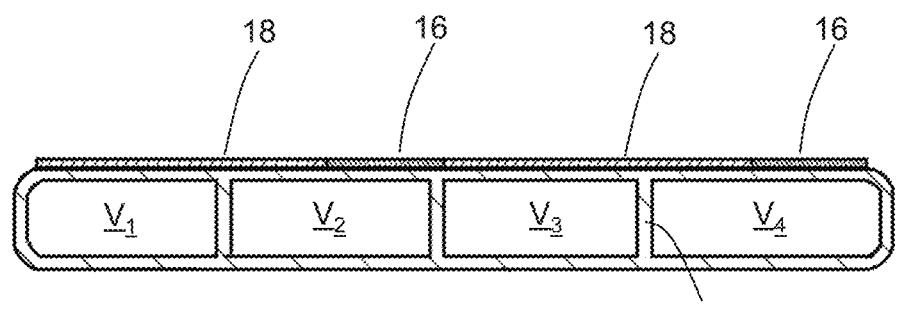

FIG. 3A to 3D are cross-sections of the panel 12, the photochromic surfaces 16, and the photovoltaic surfaces 18 according to different implementations. The cross-sections in FIG. 3 are taken along the dotted line A-A in FIG. 1. In each implementation, the panel 12 includes a top surface 20 and a bottom surface 22. In FIGS. 3A, 3B, and 3D, the panel 12 also includes side surfaces 24 that give the cross-section of the panel 12 a rectangular shape. In FIG. 3C, the top and bottom surfaces 20, 22 are bonded along the edges, as shown by joint 26. The panel 12 may be made from a suitable material that is flexible and non-permeable, e.g., from plastic or another polymer.

As illustrated in FIGS. 3A and 3D, thin layers of material that form the photochromic surfaces 16 and the photovoltaic surfaces 18 may be attached to the top surface 20 of the panel 12. For example, the photochromic surfaces 16 and the photovoltaic surfaces 18 may be painted onto the top surface 20 of the panel 12 using specialized paints. A sheet of material having photochromic or photovoltaic properties may also be adhered to the top surface 20 of the panel 12. Some implementations may include a combination of paint and one or more thin sheets of material. Some implementations may include multiple layers of paints (e.g., thin film solar paint) and resins that form photovoltaic surfaces 18 based on hybrids, organic and inorganic semiconductors. Other implementations may include conventional solar panels made of photovoltaic cells. The photochromic surfaces 16 and the photovoltaic surfaces 18 in the illustrated examples are arranged next to one another without any gaps and form joints or seams 28 that extend along the top surface 20. In other implementations, there may be a gap between the photochromic surfaces 16 and the photovoltaic surfaces 18.

In FIG. 3B, the photochromic surfaces 16 and the photovoltaic surfaces 18 are part of a cover 30 that is attached to a panel surface, e.g., the side surfaces 24, by buttons 32. Instead of buttons 32, the cover 30 may be glued, tied, welded, or attached to the panel 12 in any other permanent or detachable manner. Instead of a separate cover 30, the photochromic surfaces 16 and the photovoltaic surfaces 18 may form part of the top surface 20 of the panel 12, as illustrated in FIG. 3C. The different panel cross-sections can be combined with the different ways of attaching the photochromic surfaces 16 and photovoltaic surfaces 18 in FIG. 3A to 3D.

The panels 12 may also include reinforcing elements. For example, FIG. 3C illustrates a plurality of columns 34 that are each connected to the top and bottom surfaces 20, 22. The columns 34 reinforce the panel 12 without subdividing the space inside the panel 12. In contrast, FIG. 3D illustrates a panel 12 that includes inner walls 36 that extend perpendicularly to the page and divide the inner space of the panel 12 into four separate compartments $V_1$ to $V_4$. Instead of top, bottom, and side surfaces 20, 22, 24 that are formed by a single part, the panel 12 may also include two or more smaller panels that are joined, e.g., bonded, together.

In order to create the variable shade pattern 14 illustrated in FIGS. 1 and 2, the parts of the panel 12 that are between the photochromic surfaces 16 and the ground are clear, i.e., transparent. For example, if the photochromic surfaces 16 are attached to the top surface 20 of the panel, at least the parts of the top and bottom surfaces 20, 22 that are below, i.e., overlap or underlie, the photochromic surfaces 16 are transparent. Since the photovoltaic surfaces 18 are opaque, the surfaces 20, 22 below the photovoltaic surfaces 18 do not necessarily need to be transparent. However, in some implementations, the top and bottom surfaces 20, 22 can each be formed by a sheet of transparent material, e.g., clear plastic. If the photochromic surfaces 16 are part of the top surface 20 (e.g. FIG. 3C), at least the parts of the bottom surface 22 that are below the photochromic surfaces 16 are transparent. However, the entire bottom surface 22 may also be transparent.

As shown in FIGS. 3A and 3B, the panel 12 has a volume V. In the panel illustrated in FIG. 3D, each compartment has a volume $V_1$ to $V_4$ that form the total volume V of the panel 12. The volume V is filled with lifting gas, otherwise known as a lighter than air gas. The lifting gas creates buoyancy and lift that allows the panel 12 to float in the air.

Helium is often used as a lifting gas because it is inert and does not undergo combustion. Other examples of lifting gases are hydrogen or a mixture of helium and hydrogen. Lifting gases have a lower density than the atmosphere, causing the lifting gases to rise. For example, dry air has a density of about 1.292 kg/m³ at standard conditions for temperature and pressure (STP), i.e., a temperature of 273.15 K (0° C., 32° F.) and an absolute pressure of 105 Pa (100 kPa, 1 bar). Helium has a density of about 0.179 kg/m³ at STP. The difference in densities creates a buoyant force $F_b$ that can be calculated according to the following equation:

$$F_b = (\rho_{air} - \rho_{gas}) * g * V \quad (1)$$

where $F_b$ is the buoyant force in Newton, g is gravitational acceleration, i.e., 9.8 m/s² or 9.8 N/kg, and V is the volume in m³. This equation may be simplified to determine the mass that can be lifted by a cubic meter of lifting gas. For example, the amount of mass that can be lifted by one cubic meter of helium at STP is determined by:

$$(1.292 - 0.179)\frac{kg}{m^3} = 1.113 \frac{kg}{m^3} \quad (2)$$

The volume V in Equation (1) corresponds to the volume V of the panel 12, e.g., in FIGS. 3A and 3B. In other words, the lifting gas inside of the panel 12 exerts a buoyant force $F_b$ on the material that forms the panel 12. More specifically, the panels 12 in FIG. 3A to 3D each have a combined mass M that includes the weight of the material that forms the panel, the weight of the photochromic surfaces 16 and the photovoltaic surfaces 18, and the weight of any accessories, such as the cover 30 or fasteners 32. For example, the batteries that are charged by the photovoltaic surfaces 18 and other accessories may not be held in the air by the floating panel 12. Based on Equations (1) and (2), the volume necessary to lift the combined mass M of the panel 12 can be calculated according to the following equation:

$$V_{STP} = \frac{M}{(\rho_{air} - \rho_{gas})} \quad (3)$$

According to Charles's law, When a dry gas, e.g., helium, is held at constant pressure, the Kelvin temperature and the volume will be in direct proportion, which can be written as:

$$\frac{V_2}{V_1} = \frac{T_2}{T_1} \quad (4)$$

Accordingly, the volume V at a given temperature T can be expressed as:

$$\frac{V}{V_{STP}} = \frac{T}{T_{STP}} = \frac{T}{273.15 \text{ K}} \quad (5)$$

Assuming a $V_{STP}$ of 1 m³, Equation (5) can be substituted into Equation (3) to determine the volume V at the relevant temperature T:

$$V = \frac{M}{(\rho_{air} - \rho_{gas})} * \frac{T}{273.15 \text{ K}} \quad (6)$$

where V is the volume of the panel 12; M is the total weight, i.e., the weight of the panel 12, the photochromic surfaces 16, the photovoltaic surfaces 18, and any floating accessories, such as attachment flaps of the cover 30 or buttons 32; and T is the temperature in Kelvin.

Figure 5:
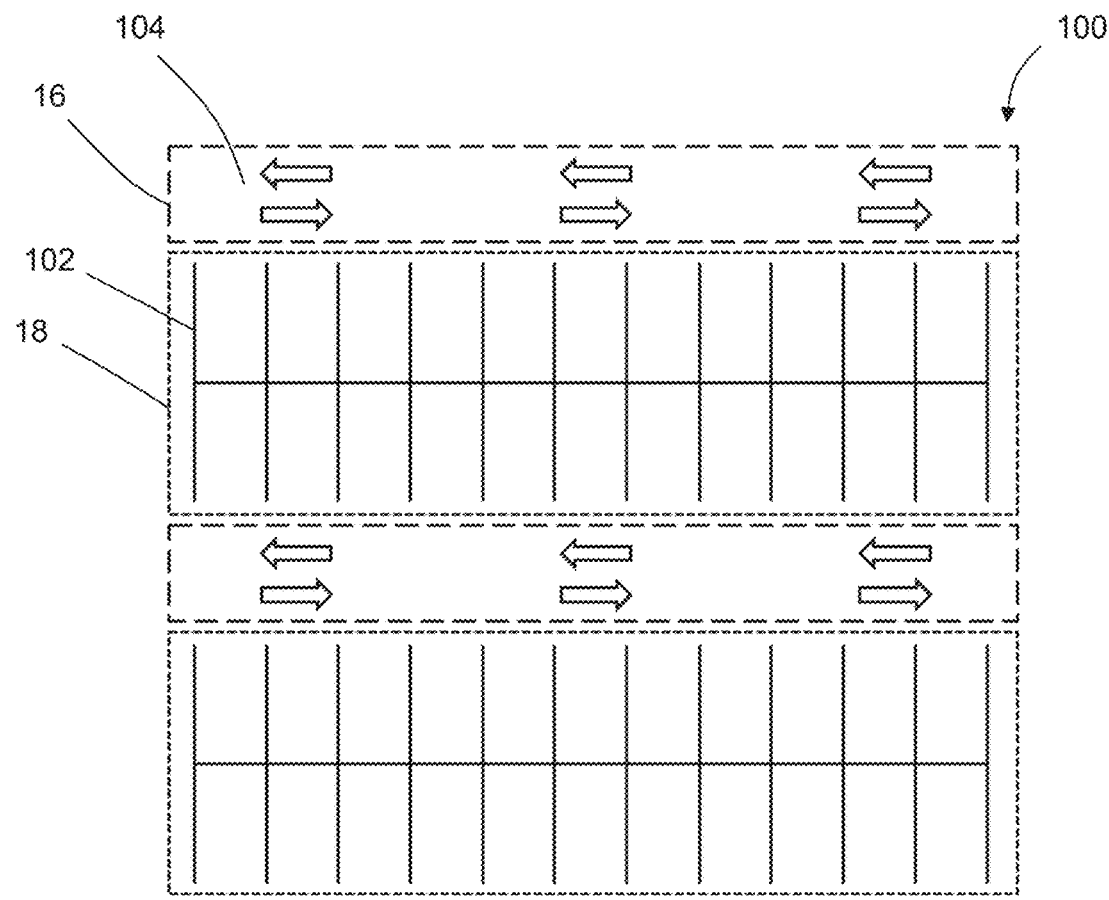
FIGS. 5 and 6 are schematic diagrams that show implementations of the shade in use.
Figure 6:
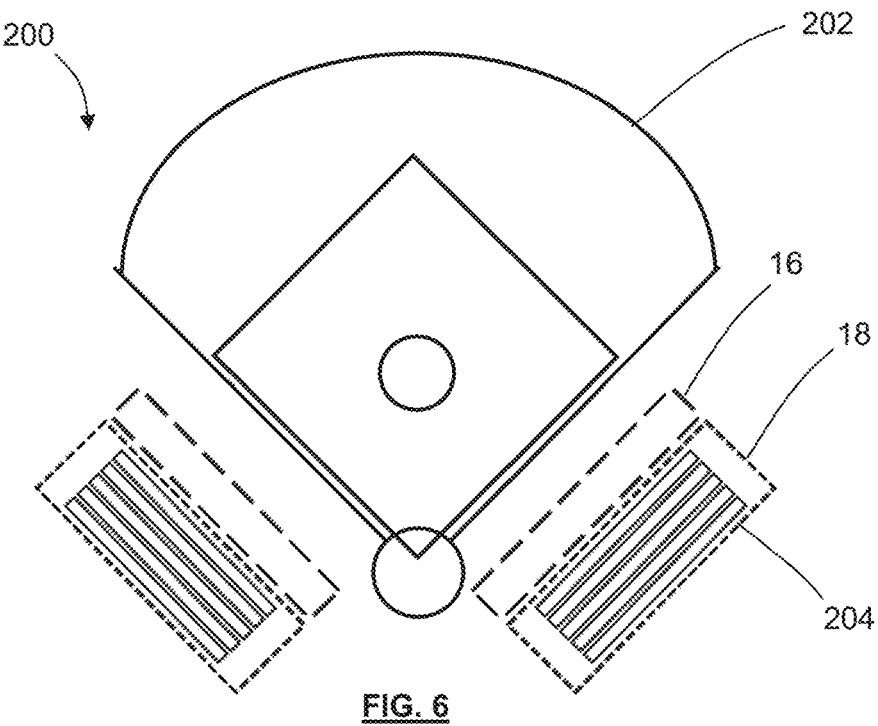

For the implementations of the panel 12 in FIGS. 3A, 3B, and 3D, the volume of the panel 12 corresponds to a height h of the side surfaces 24 multiplied by the area A of the bottom surface:

$$h = \frac{M}{A * (\rho_{air} - \rho_{gas})} * \frac{T}{273.15 \text{ K}} \quad (7)$$

where h is in meters and A is in square meters. In many implementations, the area of the bottom surface corresponds to the area to be shaded, e.g., a sports field or a parking lot (FIGS. 5 and 6). Although Equations (6) and (7) account for the difference in volume using Charles's law, the height of the panel 12 may also be calculated so that the total volume is up to 30% greater than the volume calculated at 273.15 K, i.e., at 0° C.:

$$h = \frac{M}{1.3A*(\rho_{air}-\rho_{gas})} \qquad (8)$$

Since the densities of air and helium are temperature dependent, the additional volume maintains buoyancy at higher temperatures.

As described above, the volume of the panel 12 is dimensioned so that the panel 12 is buoyant and floats in the air. As shown in FIGS. 1 and 2, the panel 12 is tethered to the ground to prevent it from floating away. For example, the shade 10 may include ropes or tethers 38 that are connected at one end to a corresponding hook or eyelet of the panel 12 and at another end to a ground anchor 40. The ground anchors 40 may include a part for tying the tether 38, e.g., a ring, and a stake that can be driven into the ground. Instead of a stake, the ground anchors 40 may have a weighted portion that rests on the ground and resists the buoyant force.

Figure 4:
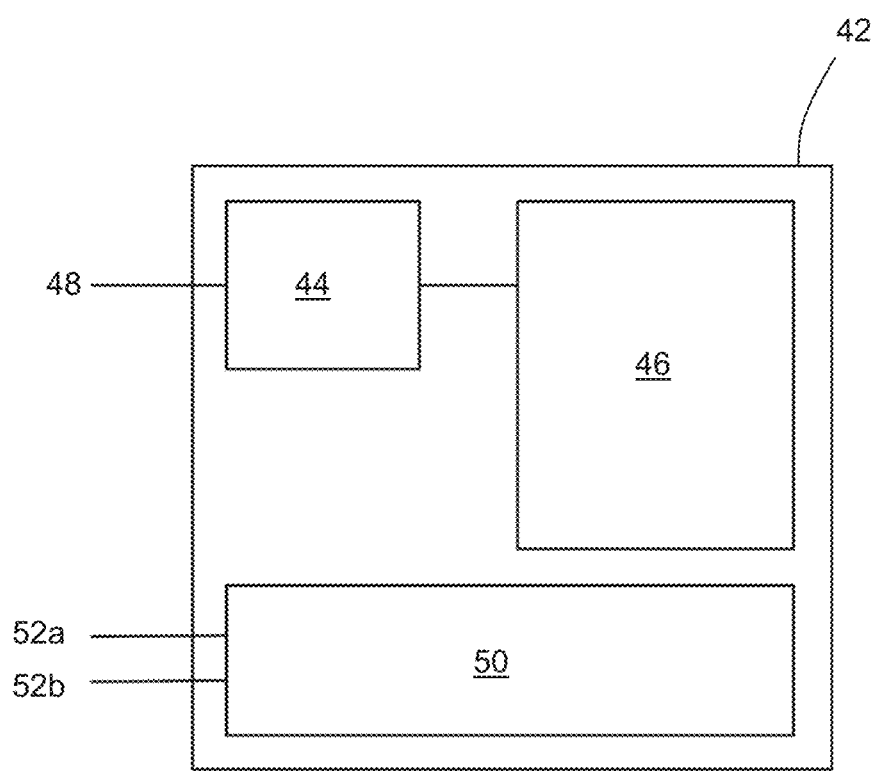
FIG. 4 is a schematic diagram of a base unit according to an implementation.

The panel 12 may also be connected to a base unit 42 that is placed on the ground, as illustrated in FIGS. 1 and 4. In one implementation, the base unit 42 includes a monitoring unit 44 and a gas tank or canister 46. In the event of a temperature change, the monitoring unit 44 may be configured to automatically inject additional gas from the canister 46 into the panel 12 via a gas tube 48. Although the illustrated base unit 42 rests on the ground, in other implementations, the base unit 42 may rest elsewhere below the panel 12, e.g., on the roof of a nearby building, or even on the panel itself.

In the implementation of FIG. 5, the base unit 42 also includes a battery 50 that electrically connects to and is charged by the photovoltaic surfaces 18. A wire 52a, 52b connects each of the photovoltaic surfaces 18 to the battery 50. Although the base unit 42 is illustrated with a single battery 50, other implementations may include more than one battery.

In the illustrated implementation, the gas tube 48 and the wires 52a, 52b are enclosed by a sheath 54 that connects to a port 56 on the side surface 24 of the panel 12. In some implementations, the one or more batteries 50 may be housed separately from the monitoring unit 44 and the gas canister 46 and the corresponding wires 52a, 52b may be guided to the photovoltaic surfaces 18 separately from the gas tube 48. In some implementations, the gas tube 48 or the wires 52a, 52b may be routed along one of the tethers 38.

FIGS. 5 and 6 are schematic representations of the shade in exemplary contexts. For example, a parking lot 100 includes a plurality of parking spots or spaces 102 and one or more driving lanes 104. For example, the parking spots or spaces 102 may have a combined surface area of about 20 to 1,000 m² or 200 to 10,000 ft². As shown by the dashed lines, a shade can be dimensioned so that the parking spots 102 are in the shadow of the photovoltaic surfaces 18. The driving lanes 104 are in the shadow of the photochromic surfaces 16. In such an implementation, parked cars are continuously provided with shade. The photochromic surfaces 16 ensure a balance of shade and visibility for moving vehicles.

In another example, a sports facility 200 may include a playing field 202 and one or more spectator seating areas 204. The photochromic surfaces 16 and the photovoltaic surfaces 18 may cast a shadow pattern over the seating areas 204 to provide shade for the spectators without impairing visibility.

In the examples of FIGS. 5 and 6, the shade may replace more permanent structures, such as conventional parking garages or parts of stadiums. In addition to these examples, the shade may also be used for construction sites or in public transportation.

Described implementations of the subject matter can include one or more features, alone or in combination.

For example, in a first implementation, a parking shade for a parking lot including a plurality of parking spots and one or more driving lanes includes: a panel that is configured to be inflated with a lifting gas to create a buoyant force and comprises hooks or eyelets for attaching tethers, wherein a top surface and a bottom surface of the panel are dimensioned to cover the parking spots and one or more driving lanes; one or more photochromic surfaces that reversibly darken on exposure to ultraviolet radiation and are arranged on the top surface of the panel, wherein portions of the panel that overlap with the one or more photochromic surfaces are transparent, and wherein the one or more photochromic surfaces are arranged to be positioned over the one or more driving lanes; and one or more photovoltaic units that are arranged on the top surface of the panel, wherein the one or more photovoltaic units are arranged to be positioned over and cover the parking spots.

The foregoing and other implementations can each, optionally, include one or more of the following features, alone or in combination:

A first aspect, combinable with the general implementation, includes a cover attached to the panel that includes the one or more photochromic surfaces or the one or more photovoltaic units.

A second aspect, combinable with any of the previous or following aspects, where the one or more photochromic surfaces or the one or more photovoltaic units include a paint layer adhered to the top surface of the panel.

A third aspect, combinable with any of the previous or following aspects, where the one or more photochromic surfaces or the one or more photovoltaic units include a sheet adhered the top surface of the panel.

A fourth aspect, combinable with any of the previous or following aspects, where the bottom surface of the panel includes a clear plastic sheet.

A fifth aspect, combinable with any of the previous or following aspects, where the top surface of the panel includes a clear plastic sheet.

A sixth aspect, combinable with any of the previous or following aspects, includes a pressurized gas canister, a gas tube that connects the canister and the panel, and a monitoring unit configured to automatically inject gas into the panel from the canister.

A seventh aspect, combinable with any of the previous or following aspects, includes a plurality of flexible tethers that are each connected to a respective hook or eyelet of the panel.

An eighth aspect, combinable with any of the previous or following aspects, where a height of the panel perpendicular to the bottom surface is between about 110% and 130% of h, wherein h is defined as $$h = \frac{M}{A*(\rho_{air}-\rho_{gas})} * \frac{T}{273.15 \text{ K}}$$

where h is in meters; A is the area of the bottom surface in square meters; M is the combined weight of the panel, the one or more photochromic surfaces, and the one or more photovoltaic units in kg; $\rho_{air}$ is the density of air in kg/m³ at standard conditions for temperature and pressure; $\rho_{gas}$ is the density of the lifting gas in kg/m³ at standard conditions for temperature and pressure; and T is the temperature in Kelvin.

A ninth aspect, combinable with any of the previous or following aspects, where the area A of the bottom surface corresponds to a surface area of the parking lot, and the one or more photovoltaic units have a combined surface area of about 20 to 1000 m².

In a second implementation, a sun shade includes: a panel that is configured to be inflated with a lifting gas to create a buoyant force and comprises hooks or eyelets for attaching tethers; one or more photochromic surfaces that reversibly darken on exposure to ultraviolet radiation and are arranged on a top surface of the panel, wherein portions of the panel that overlap with the one or more photochromic surfaces are transparent; and one or more photovoltaic units that are arranged on the top surface of the panel.

The foregoing and other implementations can each, optionally, include one or more of the following features, alone or in combination:

A first aspect, combinable with the general implementation, where the one or more photochromic surfaces or the one or more photovoltaic units include a paint layer adhered to the top surface of the panel.

A second aspect, combinable with the general implementation, where the one or more photochromic surfaces or the one or more photovoltaic units include a sheet adhered the top surface of the panel.

A third aspect, combinable with the general implementation, includes a cover attached to the panel that includes the one or more photochromic surfaces or the one or more photovoltaic units.

A fourth aspect, combinable with the general implementation, where a bottom surface of the panel includes a clear plastic sheet.

A fifth aspect, combinable with the general implementation, where the top surface of the panel includes a clear plastic sheet.

A sixth aspect, combinable with the general implementation, includes a pressurized gas canister, a gas tube that connects the canister and the panel, and a monitoring unit configured to automatically inject gas into the panel from the canister.

A seventh aspect, combinable with the general implementation, includes flexible tethers that are each connected to a respective hook or eyelet of the panel.

An eighth aspect, combinable with the general implementation, includes a plurality of anchors each connected to a respective tether.

A ninth aspect, combinable with the general implementation, where a volume of the panel is between about 110% and 130% of $V_p$, wherein $V_p$ is defined as $$V_p = \frac{M}{(\rho_{air} - \rho_{gas})} * \frac{T}{273.15 \text{ K}}$$

where $V_p$ is in m³; M is the combined weight of the panel, the one or more photochromic surfaces, and the one or more photovoltaic units in kg; $\rho_{air}$ is the density of air in kg/m³ at standard conditions for temperature and pressure; $\rho_{gas}$ is the density of the lifting gas in kg/m³ at standard conditions for temperature and pressure; and T is the temperature in Kelvin.

While this specification contains many specific details of implementations, these should not be construed as limitations on the scope of any invention or of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in combination with one another. Moreover, although features may be described herein as acting in certain combinations and even initially claimed as such, one or more features from a claimed combination can in some cases be excised from the combination, and the claimed combination may be directed to a sub-combination of features.

Particular implementations of the subject matter have been described. Other implementations are within the scope of the following claims.

What is claimed is:

1. A parking shade for a parking lot that includes a plurality of parking spots and one or more driving lanes, the parking shade comprising:
   a panel that is configured to be inflated with a lifting gas to create a buoyant force and comprises hooks or eyelets for attaching tethers, wherein a top surface and a bottom surface of the panel are dimensioned to cover the parking spots and one or more driving lanes;
   one or more photochromic surfaces that reversibly darken on exposure to ultraviolet radiation and are arranged on the top surface of the panel, wherein portions of the panel that overlap with the one or more photochromic surfaces are transparent, and wherein the one or more photochromic surfaces are arranged to be positioned over the one or more driving lanes;
   one or more photovoltaic units that are arranged on the top surface of the panel, wherein the one or more photovoltaic units are arranged to be positioned over and cover the parking spots; and
   a pressurized gas canister, a gas tube that connects the canister and the panel, and a monitoring unit configured to automatically inject gas into the panel from the canister.

2. The parking shade of claim 1, further comprising a cover attached to the panel and comprising the one or more photochromic surfaces or the one or more photovoltaic units.

3. The parking shade of claim 1, wherein the one or more photochromic surfaces or the one or more photovoltaic units comprise a paint layer adhered to the top surface of the panel.

4. The parking shade of claim 1, wherein the one or more photochromic surfaces or the one or more photovoltaic units comprise a sheet adhered the top surface of the panel.

5. The parking shade of claim 1, wherein the bottom surface of the panel comprises a clear plastic sheet.

6. The parking shade of claim 5, wherein the top surface of the panel comprises a clear plastic sheet.

7. The parking shade of claim 1, further comprising a plurality of flexible tethers that are each connected to a respective hook or eyelet of the panel.

8. The parking shade of claim 1, wherein a height of the panel perpendicular to the bottom surface is between about 110% and 130% of h, wherein h is defined as $$h = \frac{M}{A * (\rho_{air} - \rho_{gas})} * \frac{T}{273.15 \text{ K}}$$

where h is in meters; A is the area of the bottom surface in square meters; M is the combined weight of the panel, the one or more photochromic surfaces, and the one or more photovoltaic units in kg; $\rho_{air}$ is the density of air in kg/m$^3$ at standard conditions for temperature and pressure; $\rho_{gas}$ is the density of the lifting gas in kg/m$^3$ at standard conditions for temperature and pressure; and T is the temperature in Kelvin.

9. The parking shade of claim 8, wherein the area A of the bottom surface corresponds to a surface area of the parking lot, and the one or more photovoltaic units have a combined surface area of about 20 to 1000 m$^2$.

10. A sun shade comprises:
a panel that is configured to be inflated with a lifting gas to create a buoyant force and comprises hooks or eyelets for attaching tethers;
one or more photochromic surfaces that reversibly darken on exposure to ultraviolet radiation and are arranged on a top surface of the panel, wherein portions of the panel that overlap with the one or more photochromic surfaces are transparent;
one or more photovoltaic units that are arranged on the top surface of the panel; and
a pressurized gas canister, a gas tube that connects the canister and the panel, and a monitoring unit configured to automatically inject gas into the panel from the canister.

11. The sun shade of claim 10, wherein the one or more photochromic surfaces or the one or more photovoltaic units comprise a paint layer adhered to the top surface of the panel.

12. The sun shade of claim 10, wherein the one or more photochromic surfaces or the one or more photovoltaic units comprise a sheet adhered the top surface of the panel.

13. The sun shade of claim 10, further comprising a cover attached to the panel and comprising the one or more photochromic surfaces or the one or more photovoltaic units.

14. The sun shade of claim 10, wherein a bottom surface of the panel comprises a clear plastic sheet.

15. The sun shade of claim 14, wherein the top surface of the panel comprises a clear plastic sheet.

16. The sun shade of claim 10, further comprising flexible tethers that are each connected to a respective hook or eyelet of the panel.

17. The sun shade of claim 16, further comprising a plurality of anchors each connected to a respective tether.

18. The sun shade of claim 10, wherein a volume of the panel is between about 110% and 130% of $V_p$, wherein $V_p$ is defined as $$V_p = \frac{M}{(\rho_{air} - \rho_{gas})} * \frac{T}{273.15 \text{ K}}$$

where $V_p$ is in m$^3$; M is the combined weight of the panel, the one or more photochromic surfaces, and the one or more photovoltaic units in kg; $\rho_{air}$ is the density of air in kg/m$^3$ at standard conditions for temperature and pressure; $\rho_{gas}$ is the density of the lifting gas in kg/m$^3$ at standard conditions for temperature and pressure; and T is the temperature in Kelvin.

* * * * *

UNITED STATES PATENT AND TRADEMARK OFFICE
CERTIFICATE OF CORRECTION

PATENT NO. : 11,202,488 B1
APPLICATION NO. : 16/989556
DATED : December 21, 2021
INVENTOR(S) : Zhenzhu Wan and Yin Xu It is certified that error appears in the above-identified patent and that said Letters Patent is hereby corrected as shown below:

In the Claims

<u>Column 8</u>
Claim 4, Line 51, after "adhered" insert -- to --.

<u>Column 10</u>
Claim 12, Line 3, after "adhered" insert -- to --.

Signed and Sealed this
Twenty-eighth Day of February, 2023

Katherine Kelly Vidal
*Director of the United States Patent and Trademark Office*